(12) United States Patent
Matsumoto et al.

(10) Patent No.: US 7,593,304 B2
(45) Date of Patent: Sep. 22, 2009

(54) APPARATUS AND METHOD FOR RECORDING AND REPRODUCING HOLOGRAM, AND SPATIAL LIGHT MODULATOR THEREFOR

(75) Inventors: Kazuki Matsumoto, Kanagawa (JP); Akiko Hirao, Chiba (JP); Rumiko Hayase, Kanagawa (JP); Takayuki Tsukamoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 699 days.

(21) Appl. No.: 11/209,800

(22) Filed: Aug. 24, 2005

(65) Prior Publication Data
US 2006/0077853 A1 Apr. 13, 2006

(30) Foreign Application Priority Data
Sep. 29, 2004 (JP) .............................. 2004-285491

(51) Int. Cl.
G11B 7/00 (2006.01)
(52) U.S. Cl. ....................................... 369/103
(58) Field of Classification Search ................ 369/103, 369/126; 359/22
See application file for complete search history.

(56) References Cited

U.S. PATENT DOCUMENTS

| 5,978,112 | A | * | 11/1999 | Psaltis et al. ................... 359/22 |
| 7,012,722 | B2 | | 3/2006 | Ogasawara |
| 7,166,626 | B2 | * | 1/2007 | Koppel ........................ 514/375 |
| 2005/0179969 | A1 | | 8/2005 | Ogasawara |

FOREIGN PATENT DOCUMENTS

| CN | 1658090 | 8/2005 |
| EP | 1 564 728 A2 | 8/2005 |
| JP | 2002-123949 | 4/2002 |
| JP | 2005-227704 | 8/2005 |

OTHER PUBLICATIONS

Notification of the First Office Action issued by the Chinese Patent Office on Dec. 29, 2006, for Chinese Patent Application No. 200510107604.7, and English-language translation thereof.
Horimai, H. et al., "A Novel Collinear Optical Setup for Holographic Data Storage System," Technical Digest of Optical Data Storage Topical Meeting 2004, pp. 258-260, (2004).
Office Action issued by the Japanese Patent Office on Nov. 21, 2006, for Japanese Patent Application No. 2004-285491, and partial English translation of the Office Action.

* cited by examiner

*Primary Examiner*—Nabil Z Hindi
(74) *Attorney, Agent, or Firm*—Finnegan, Henderson, Farabow, Garrett & Dunner, L.L.P.

(57) ABSTRACT

A hologram recording/reproducing apparatus includes a recording/reproducing optical system that guides at least one of an information beam and a reference beam to an optical recording medium; a spatial light modulator that is arranged in an optical path of the recording/reproducing optical system, and spatially modulates a beam guided via the recording/reproducing optical system to generate the information beam; a first misalignment detecting unit that detects a first misalignment between the recording/reproducing optical system and the spatial light modulator using a beam for detecting the first misalignment; and a first misalignment correcting unit that corrects the first misalignment based on the first misalignment detected by the first misalignment detecting unit.

8 Claims, 8 Drawing Sheets

APPARATUS AND METHOD FOR RECORDING AND REPRODUCING HOLOGRAM, AND SPATIAL LIGHT MODULATOR THEREFOR

CROSS-REFERENCE TO RELATED APPLICATIONS

This application is based upon and claims the benefit of priority from the priority Japanese Patent Application 2004-285491, filed on Sep. 29, 2004; the entire contents of which are incorporated herein by reference.

BACKGROUND OF THE INVENTION

1. Field of the Invention

The present invention relates to an optical recording/reproducing technique for recording and reproducing information with the use of light, and more particularly to an apparatus and a method of recording and reproduction with the use of holography, and a spatial light modulator therefor.

2. Description of the Related Art

Conventionally, an optical recording/reproducing apparatus that records information with the use of light is utilized for recording and reproducing a large volume of data such as a high-density image data. Such optical recording/reproducing apparatuses which are already put into practical use are, for example, a magneto-optical recording/reproducing apparatus for a medium such as a Magneto Optical Disk (MO), and a phase-change optical recording/reproducing apparatus for a medium such as a Compact Disk Rewritable (CD-RW), a Digital Versatile Disk Random Access Memory (DVD-RAM).

In recent years, among the optical recording/reproducing apparatuses, a hologram recording/reproducing apparatus draws a particular attention as an apparatus capable of providing a further improvement in information recording density. In the hologram recording/reproducing apparatus, in general, information to be recorded is provided to an information beam as a two-dimensional pattern, and the information beam is interfered with a reference beam in an optical recording medium for recording of the information as an interference pattern (hologram). For reproduction, the reference beam alone is applied onto the recorded interference pattern in the same arrangement as at the recording, to retrieve the information as a diffraction image from the hologram. Thus, in the hologram recording/reproducing apparatus, information is recorded and/or reproduced as a two-dimensional pattern, whereby high-speed recording and reproduction of large-volume information can be achieved.

In view of further improvement in information recording density, various types of hologram recording/reproducing apparatuses are proposed. One example is a hologram recording/reproducing apparatus of volume hologram type. The volume hologram type hologram recording/reproducing apparatus is provided with an optical recording medium whose thickness is sufficiently larger than a wavelength of light, in order to allow recording of various interference patterns in a thickness direction as well as in a plane direction of the optical recording medium. Hence, the interference pattern can be three-dimensionally recorded in the optical recording medium. In other words, information can be recorded in the same region of the optical recording medium in a multiplexing manner, to increase the storage capacity.

Another proposed hologram recording/reproducing apparatus is a shift multiplexing type. In the shift multiplexing type hologram recording/reproducing apparatus, position of irradiation of the reference beam at the information reproduction is slightly shifted from those at the recording. Then, even when the recorded interference pattern is irradiated with the reference beam, due to the lack of phase matching between the reference beam and the interference pattern, the diffraction pattern cannot be obtained. When the reference beam is maintained in the position where the diffraction pattern is not obtained and further recording of interference pattern with another information beam is performed, a plurality of two-dimensional information can be recorded in a multiplex manner in the same recording area of the optical recording medium depending on the arrangement of the reference beam.

Still another proposed hologram recording/reproducing apparatus uses a spatially modulated reference beam. In a simple hologram recording/reproducing apparatus, a reference beam with an in-phase plane wave is used. In this hologram recording/reproducing apparatus, however, a spatially modulated reference beam is used. The recorded interference pattern is complicated and the phase matching condition for the reference beam and the interference pattern is strict. Hence, the higher recording multiplicity is achievable (Japanese Patent Laid-Open Publication No. 2002-123949, for example, discloses a hologram recording/reproducing apparatus employing a holography and using a recording reference beam whose phase is spatially modulated.). In a recently-proposed hologram recording technique, one spatial light modulator generates both the information beam and the modulated reference beam for the hologram recording (see, for example, Hideyoshi Horimai and Jun Li, "A novel Collinear optical Setup for Holographic data Storage System," Technical Digest of Optical Data Storage Topical Meeting 2004, pp. 258-260).

In the conventional hologram recording/reproducing apparatuses as described above, however, the arrangement of the optical elements inside the apparatus, and a subtle fluctuation in the position of the optical recording medium with respect to the apparatus, for example, significantly affect the recording/reproduction, and the portability of the optical recording medium, and the compatibility among the apparatuses or the like are difficult to enhance. At insertion and removal of the optical recording medium to and from the hologram recording/reproducing apparatus, for example, sometimes a minute misalignment between the optical recording medium and the hologram recording/reproducing apparatus occurs. Such misalignment may cause reproduction error. Specifically in the spatial modulating type hologram recording/reproducing apparatus, the strict phase matching condition between the reference beam and the interference pattern makes the problem of the misalignment of the optical elements even more notable.

The conventional hologram recording/reproducing apparatus in general includes an optical recording medium, a recording/reproducing optical system that irradiates the optical recording medium with an information beam and/or a reference beam, and a spatial light modulator that generates the information beam and the reference beam. Hence, in order to improve the reproducibility at the irradiation of the optical recording medium with the reference beam, the misalignment between the optical recording medium and the spatial light modulator must be corrected. In the conventional technique, however, only a unit for correcting the misalignment between the optical recording medium and the recording/reproducing optical system is proposed and the correction of misalignment between the optical recording medium and the spatial light modulator is not possible.

SUMMARY OF THE INVENTION

According to one aspect of the present invention, a hologram recording/reproducing apparatus includes a recording/reproducing optical system that guides at least one of an information beam and a reference beam to an optical recording medium; a spatial light modulator that is arranged in an optical path of the recording/reproducing optical system, and spatially modulates a beam guided via the recording/reproducing optical system to generate the information beam; a first misalignment detecting unit that detects a first misalignment between the recording/reproducing optical system and the spatial light modulator using a beam for detecting the first misalignment; and a first misalignment correcting unit that corrects the first misalignment based on the first misalignment detected by the first misalignment detecting unit.

According to another aspect of the present invention, a spatial light modulator is arranged in an optical path of a recording/reproducing optical system that guides at least one of an information beam and a reference beam to an optical recording medium, and spatially modulates a beam guided via the recording/reproducing optical system to generate the information beam. The spatial light modulator includes a diffracting unit that diffracts a beam for detecting a first misalignment between the spatial light modulator and the recording/reproducing optical system.

According to still another aspect of the present invention, a hologram recording/reproducing method is of correcting a first misalignment between a recording/reproducing optical system and a spatial light modulator in a hologram recording/reproducing apparatus that includes the recording/reproducing optical system guiding at least one of an information beam and a reference beam to an optical recording medium, and the spatial light modulator arranged in an optical path of the recording/reproducing optical system and spatially modulates a beam guided via the recording/reproducing optical system to generate the information beam. The hologram recording/reproducing method includes irradiating the spatial light modulator with a beam for detecting a first misalignment via the recording/reproducing optical system; receiving the beam for detecting the first misalignment, the beam being diffracted by the spatial light modulator; detecting the first misalignment based on a state of the received beam for detecting the first misalignment; and correcting the first misalignment based on the detected first misalignment.

DETAILED DESCRIPTION OF THE PREFERRED EMBODIMENTS

Exemplary embodiments of a hologram recording/reproducing apparatus according to the present invention will be explained in detail below with reference to the accompanying drawings.

A first embodiment is explained. In the first embodiment, the idea of the present invention is applied to a hologram recording/reproducing apparatus of a reflective colinear interferometry. Similarly to the conventional apparatus, a hologram recording/reproducing apparatus according to the embodiment includes an optical recording medium, a recording/reproducing optical system that irradiates the optical recording medium with an information beam and/or a reference beam for recording/reproduction of the information on the optical recording medium, a spatial light modulator (SLM) that generates the information beam and the reference beam to be employed in the recording/reproducing optical system, and a second correction optical system that corrects misalignment between the optical recording medium and the recording/reproducing optical system (a second misalignment) (hereinafter referred to as a second correction as necessary). Further, the hologram recording/reproducing apparatus according to the embodiment, as a different feature from the conventional apparatus, includes a first correction optical system that corrects misalignment between the recording/reproducing optical system and the spatial light modulator (a first misalignment) (hereinafter referred to as a first correction as necessary). The hologram recording/reproducing apparatus of the embodiment can correct the misalignment between the optical recording medium and the spatial light modulator based on the recording/reproducing optical system with the use of the first correction optical system and the second correction optical system.

Figure 1:
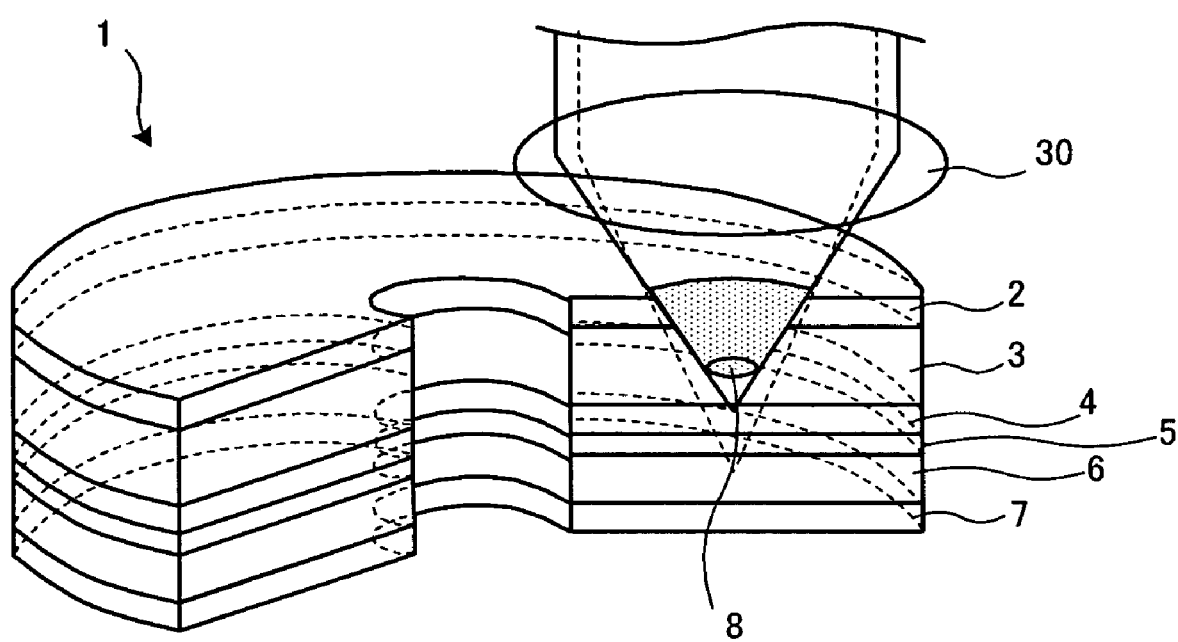
FIG. 1 is a perspective view of an optical recording medium employed in a first embodiment.

First, a structure of an optical recording medium 1 employed in the hologram recording/reproducing apparatus having the above-described features is explained. FIG. 1 is a perspective view of the optical recording medium 1 (a side part of the optical recording medium 1 is shown to be broken). The optical recording medium 1 may be formed in any planar shape, such as a disk shape, a card shape, or a block shape. The optical recording medium 1 shown in FIG. 1 is formed in a disk-shape. The optical recording medium 1 includes a protective layer 2, a recording layer 3, a gap layer 4, a dichroic reflective layer 5, a transparent substrate 6, and a reflective layer 7 laminated in this order from a side of beam incidence from the hologram recording/reproducing apparatus. The optical recording medium 1 corresponds to an optical recording medium in the appended claims.

The protective layer 2 serves to protect a surface of the recording layer 3. The recording layer 3 serves to record information through reception of irradiated information beam and reproduction beam from the hologram recording/reproducing apparatus. Hereinbelow, the information beam and the reproduction beam are collectively referred to as a recording beam as necessary. The recording layer 3 is formed from a material which optical characteristics such as an absorption and refractive index change according to the intensity of the irradiated recording beam, i.e. intensity of an electromagnetic wave. The gap layer 4 serves to prevent the recording of the hologram in an area where the light intensity of the recording beam is particularly high, and is formed from a material which transmits the recording beam with high intensity and does not mix with the recording material of the recording layer 3. The dichroic reflective layer 5 is a selective reflective layer which wavelengths of reflection and transmission are determined so as to reflect the recording beam irradiated from a recording/reproducing beam source 21 explained later and to transmit a second correction beam irradiated from a second correction beam source 71 explained later. The dichroic reflective layer 5 is formed from a dichroic multi-layer film composed of, for example, $SiO_2$, $TiO_2$, $NbO_3$, and $CaF_2$.

The transparent substrate 6 serves to transmit the second correction beam that is incoming via the dichroic reflective layer 5 and is formed from a material such as a glass, and polycarbonate. The reflective layer 7 serves to reflect the second correction beam transmitted through the dichroic reflective layer 5 and the transparent substrate 6 and is formed from a material having a high reflective index for the wavelength of the second correction beam, for example, aluminum. Here, though not shown in the drawing, a surface of the reflective layer 7 on the side of the transparent substrate 6 is formed to be an irregular surface where tracking information and address information are recorded. Here, the tracking can be performed in any manners and a continuous rotation servo system or a sampled servo system can be used. The tracking information can be recorded as a wobble pit, for example. When the optical recording medium 1 having the above-described structure, is irradiated with the recording beam via an objective lens 30 which is a part of the hologram recording/reproducing apparatus, the information beam and the reference beam interfere in the recording layer 3, thereby forming a hologram 8.

Figure 2:
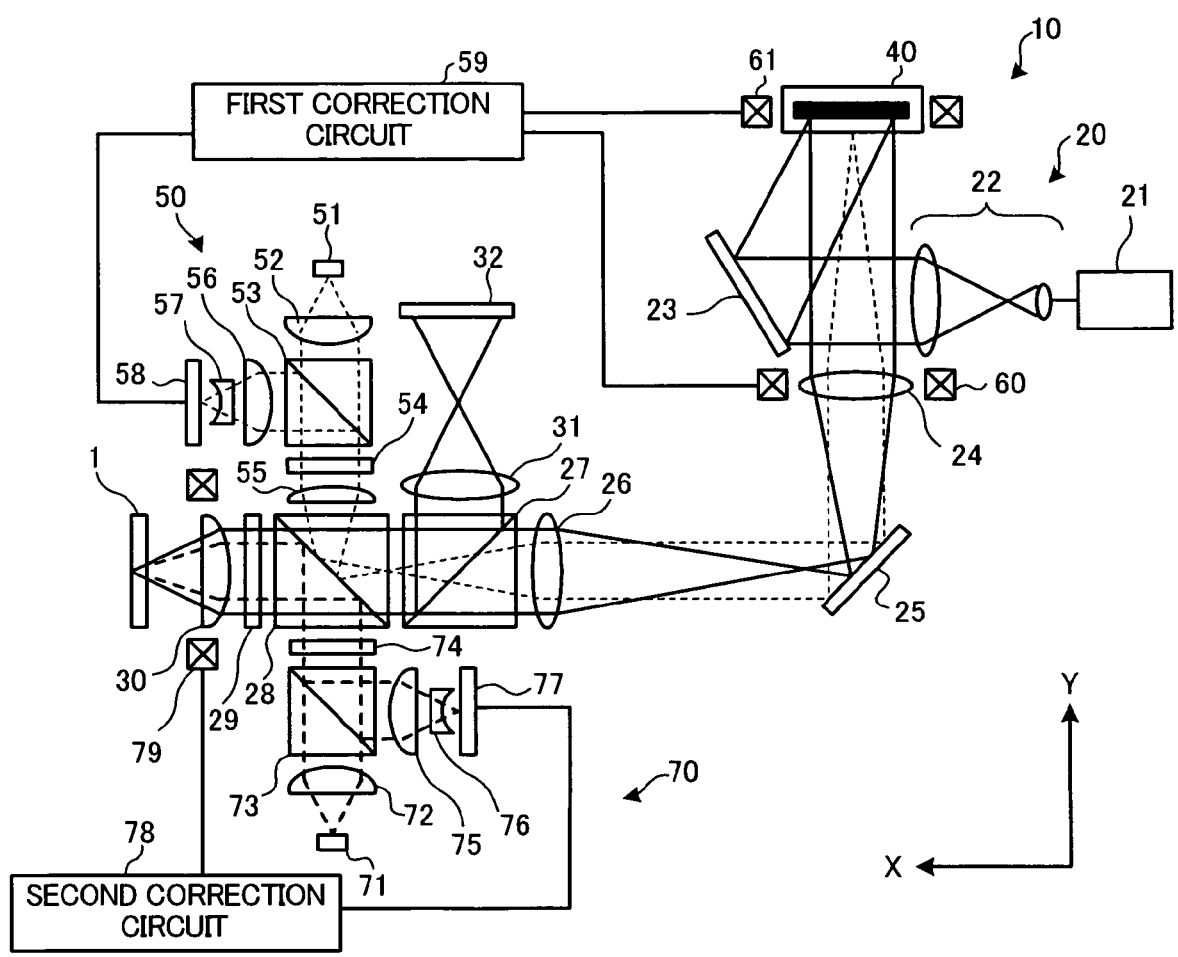
FIG. 2 is a diagram of an overall structure of a hologram recording/reproducing apparatus according to the first embodiment.

A structure of a hologram recording/reproducing apparatus 10 for recording and reproduction of the information on the optical recording medium 1 having the above-described structure is explained. FIG. 2 is a diagram of an overall structure of the hologram recording/reproducing apparatus 10 according to the embodiment. The hologram recording/reproducing apparatus 10 serves to perform recording, reproduction or the like of the information on the optical recording medium 1 and includes a recording/reproducing optical system 20, a spatial light modulator 40, a first correction optical system 50, and a second correction optical system 70. A component which has a known optical function corresponding to the name and can be structured according to a known technique is not specifically explained.

The recording/reproducing optical system 20 serves to record and reproduce the information and includes a recording/reproducing beam source 21, a beam expander 22, a mirror 23, an imaging lens 24, a mirror 25, an imaging lens 26, a polarizing beam splitter 27, a dichroic prism 28, a waveplate 29 for optical rotation, an objective lens 30, an imaging lens 31, and a two-dimensional photodetector 32. The recording/reproducing optical system 20 corresponds to a recording/reproducing optical system in the appended claims.

Here, the recording/reproducing beam source 21 is a light source used for recording and reproduction. Hereinbelow, the light beam which is emitted from the recording/reproducing beam source 21 and not subjected to the modulation by the spatial light modulator 40 yet is referred to as a recording/reproducing beam as necessary. A laser which has a suitable coherence that allows the acquisition of interference pattern can be used as such light source, for example, a linearly-polarized laser such as a laser diode, a He—Ne laser, an Argon ion laser, and a YAG laser can be employed. The beam expander 22 is a shaping unit that shapes the recording/reproducing beam emitted from the recording/reproducing beam source 21 into a collimated beam and is formed with a pair of lenses as shown. The imaging lens 24 serves to focus the recording/reproducing beam on the spatial light modulator 40 and corresponds to "an optical element that is arranged in a closest proximity to the spatial light modulator" in the appended claims.

The polarizing beam splitter 27 serves to transmit the recording beam as well as to reflect the reproducing beam. The polarizing beam splitter 27 is formed, for example, from a prism having dielectric layers. The dichroic prism 28 serves to transmit the recording beam and the reproducing beam while reflecting the first correcting beam and the second correcting beam explained later. The dichroic prism 28 is formed, for example, as a prism coated with metal thin layers or dielectric layers that transmits a beam with a certain wavelength. The dichroic prism 28 corresponds to "a common optical element in the recording/reproducing optical system" in the appended claims. The waveplate 29 serves to rotate the polarization plane of the light passing through the waveplate 29, and can be formed with a ¼ waveplate or a ½ waveplate. The two-dimensional photodetector 32 is a photoelectric converter that converts the reproducing beam into electrical signal and can be formed with, for example, a charge coupled device (CCD) array.

A structure of the spatial light modulator 40 is explained next. The spatial light modulator 40 simultaneously generates the information beam to which information is given as a two-dimensional pattern and the spatially modulated reference beam from the recording/reproducing beam irradiated via the recording/reproducing optical system 20. The spatial light modulator 40 corresponds to a spatial light modulator in the appended claims.

Figure 3:
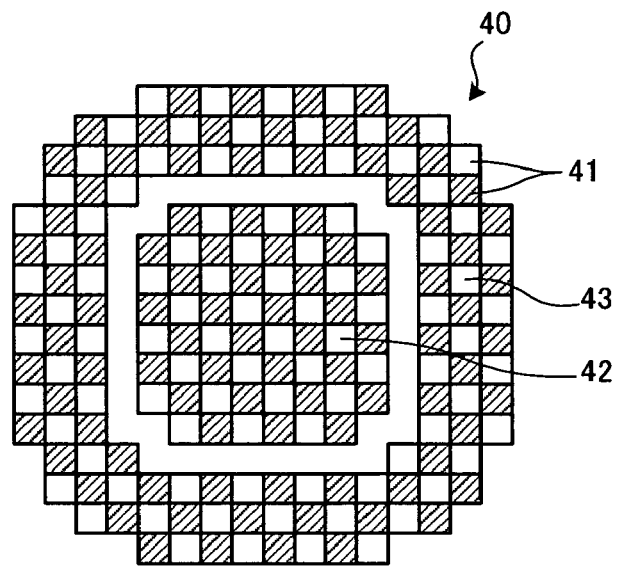
FIG. 3 is a diagram of a modulation pattern of a spatial light modulator at information recording.
Figure 4:
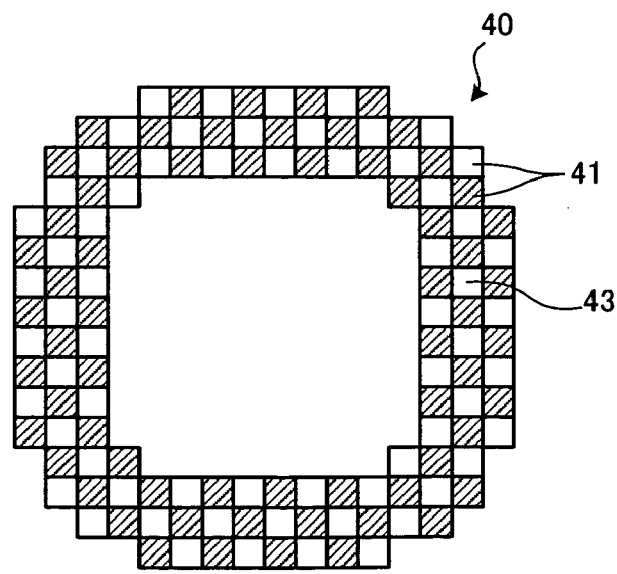
FIG. 4 is a diagram of a modulation pattern of the spatial light modulator at information reproduction.

The spatial light modulator 40 schematically is formed with a plurality of pixels 41 arranged in a two-dimensional matrix shape as shown in FIGS. 3 and 4 and generates the information beam and the reference beam by changing the direction of the recording/reproducing beam for every pixel 41, or by changing the polarizing direction of the recording/reproducing beam for every pixel 41. In a modulation pattern formed with the pixels 41, an area near the center of optical axis is an information beam area 42 for the generation of the information beam and an area in periphery is a reference beam area 43 for the generation of the reference beam. Only the reference beam area 43 for the generation of the reference beam is shown in FIG. 4.

Figure 5:
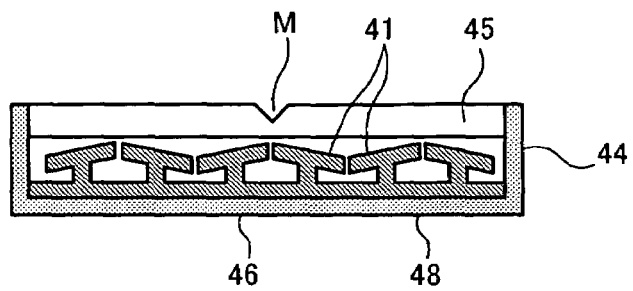
FIG. 5 is a vertical sectional view of a spatial light modulator according to the first embodiment.
Figure 6:
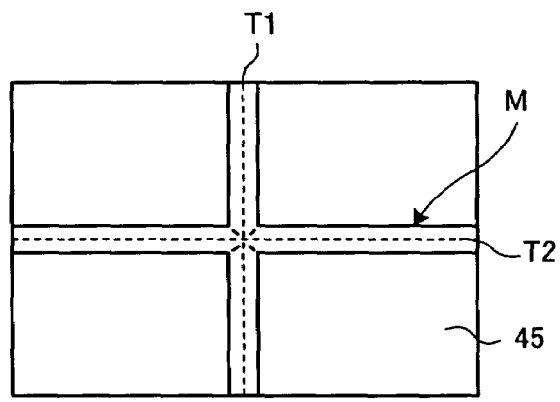
FIG. 6 is a plane view of the spatial light modulator according to the first embodiment.
Figure 7:
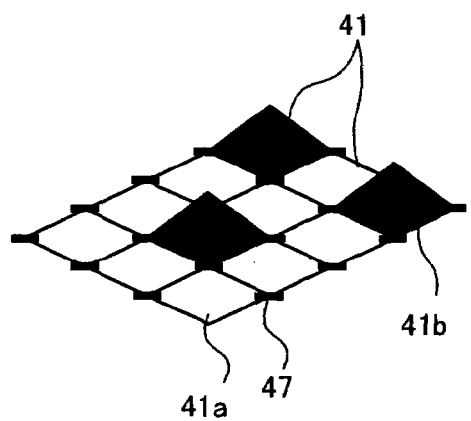
FIG. 7 is a perspective view of a digital micro mirror device.

Details of the structure of the spatial light modulator 40 are explained. FIG. 5 is a vertical section of the spatial light modulator 40 and FIG. 6 is a plane view of the spatial light modulator 40. The spatial light modulator 40 is formed with a Digital Micro-mirror Device (DMD) 46 placed in a space surrounded by a housing 44 and a transparent window 45. The DMD 46, as shown in a schematic perspective of FIG. 7, is formed with multiple pixels (micro-mirror) 41 which are coupled with each other via hinges 47 and arranged two-dimensionally on an upper surface of the substrate 48 of FIG. 5.

Figure 8:
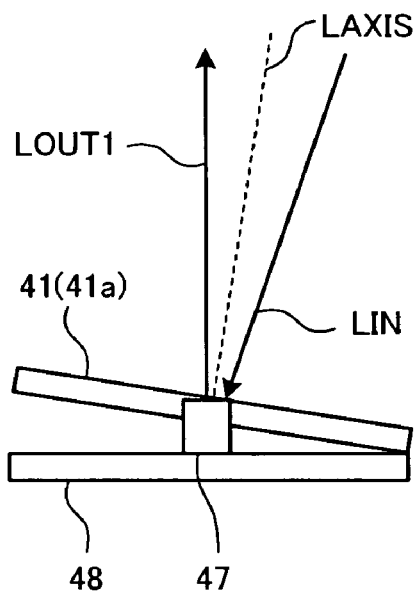
FIG. 8 is a vertical sectional view of a pixel in an ON state.
Figure 9:
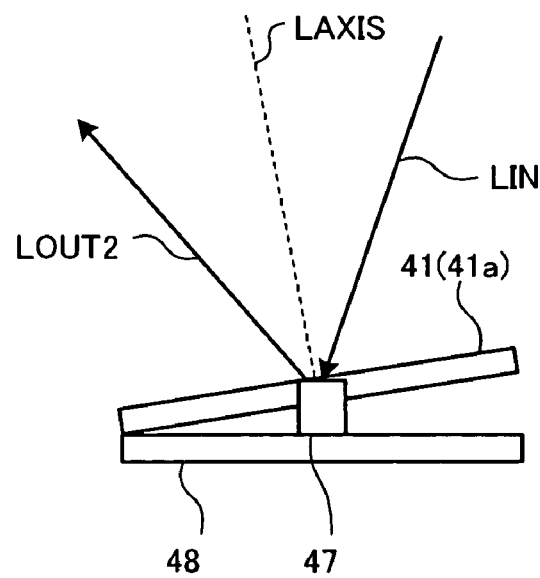
FIG. 9 is a vertical sectional view of a pixel in an OFF state

Each pixel 41 can be electrically controlled independent of each other and rotatable around the hinge 47. FIG. 8 is a vertical section of the pixel 41 in an ON state and FIG. 9 is a vertical section of the pixel 41 in an OFF state. The pixel 41, in a reference state, is horizontally arranged with respect to the substrate 48. In the ON state shown in FIG. 8, the pixel 41 can rotate by +10 degrees, while in the OFF state shown in FIG. 9, the pixel 41 can rotate by −10 degrees. Hence, when an incoming beam $L_{IN}$ is incident on the substrate 48 from the same direction, a reflective beam $L_{OUT1}$ in the ON state forms an angle of 40 degrees with a reflective beam $L_{OUT2}$ in the OFF state. In FIGS. 7 to 9, the pixel 41 in the OFF state is denoted as a pixel 41a, whereas the pixel 41 in the ON state is denoted as a pixel 41b. In FIGS. 8 and 9 the optical axis $L_{AXIS}$ of the pixel 41 is denoted by a dotted line. Thus, the electrical switching of the state of the pixel 41 between ON and OFF according to the information to be recorded on the optical recording medium 1 allows the formation of the modulation pattern as shown in FIGS. 3 and 4, and through the adjustment of the direction of reflection of the recording/reproducing beam according to the information, the information beam and the reference beam can be spatially modulated.

Returning to FIGS. 5 and 6, the transparent window 45 is provided with an alignment mark M. The alignment mark M is formed substantially in a shape of a planar cross where two tracks T1 and T2 run approximately perpendicular with each other. Tracks T1 and T2 may be formed in any manner. For example, the upper surface of the transparent window 45 may be cut to the thickness of approximately 1 μm with a diamond dicer to form the tracks T1 and T2. The alignment mark M corresponds to a diffracting unit in the appended claims. With the alignment mark M in the spatial light modulator 40, the first correction beam incident on the spatial light modulator 40 can be diffracted at the alignment mark M and the first correction can be performed with the diffracted light beam.

The tracks T1 and T2 can be formed in any direction as far as the first correction is possible. In the embodiment, the tracks are formed along two directions approximately perpendicular to the optical axis of the spatial light modulator 40 so that these two directions can be defined. Specifically, the transparent window 45 with the alignment mark M is fixed to the housing 44 so that the center of the DMD 46 on the plane corresponds with the center of the alignment mark M (a point where tracks T1 and T2 cross), and the directions of arrangement of the pixels 41 in DMD 46 correspond with the directions of tracks T1 and T2. Hence, the misalignment in two directions approximately perpendicular to the optical axis of the spatial light modulator 40 can be detected and the first correction is allowed with the movement of the spatial light modulator 40, the imaging lens 24, or the like in the same direction.

A structure of the first correction optical system 50 is explained. In FIG. 2, again, the first correction optical system 50 is a first correcting unit that serves to correct the position of the spatial light modulator 40 in the recording/reproducing optical system 20, and includes a first correcting beam source 51, a collimate lens 52, a polarizing beam splitter 53, a waveplate 54 for an optical rotation, a condenser lens 55, a convex lens 56, a cylindrical lens 57, a quarter dividing photodetector 58, a first correction circuit 59, a voice coil motor 60, and a piezoactuator 61.

The first correcting beam source 51 is a light source of a beam for the first correction (hereinafter also referred to as a first correcting beam as necessary), and a linearly-polarized laser may be employed, for example. Specifically, a laser diode, a He—Ne laser, an Argon ion laser, a YAG laser or the like can be used. The first correcting beam desirably has a different wavelength from the wavelength of the recording/reproducing beam emitted from the recording/reproducing beam source 21. For example, when the recording/reproducing beam source 21 employs a laser of approximately 532 nm in wavelength, the first correcting beam source 51 preferably employs a red laser diode of approximately 650 nm in wavelength. The first correcting beam and the second correcting beam may be of the same wavelength, and the first correcting beam source 51 can employ a laser of a same wavelength as a laser used in the second correcting beam source 71 explained later.

The collimate lens 52 is a collimated beam generating unit that converts the first correcting beam into a collimated beam. The polarizing beam splitter 53 serves to transmit the first correcting beam emitted from the first correcting beam source 51 and to reflect the first correcting beam reflected by the spatial light modulator 40. The waveplate 54 serves to rotate a plane of polarization of a beam passing through the waveplate 54. The waveplate 54 may be formed with a ¼ waveplate or a ½ waveplate, and the ¼ waveplate is more preferable for its good transmission efficiency. The quarter dividing photodetector 58 is a photoelectric converter having beam receivers 58a to 58d (not shown in FIG. 2) as four separate parts, receives the first correcting beam reflected by the spatial light modulator 40, and outputs an output signal according to the misalignment between the recording/reproducing optical system 20 and the spatial light modulator 40 (hereinafter referred to as a misalignment signal as necessary).

Figure 10:
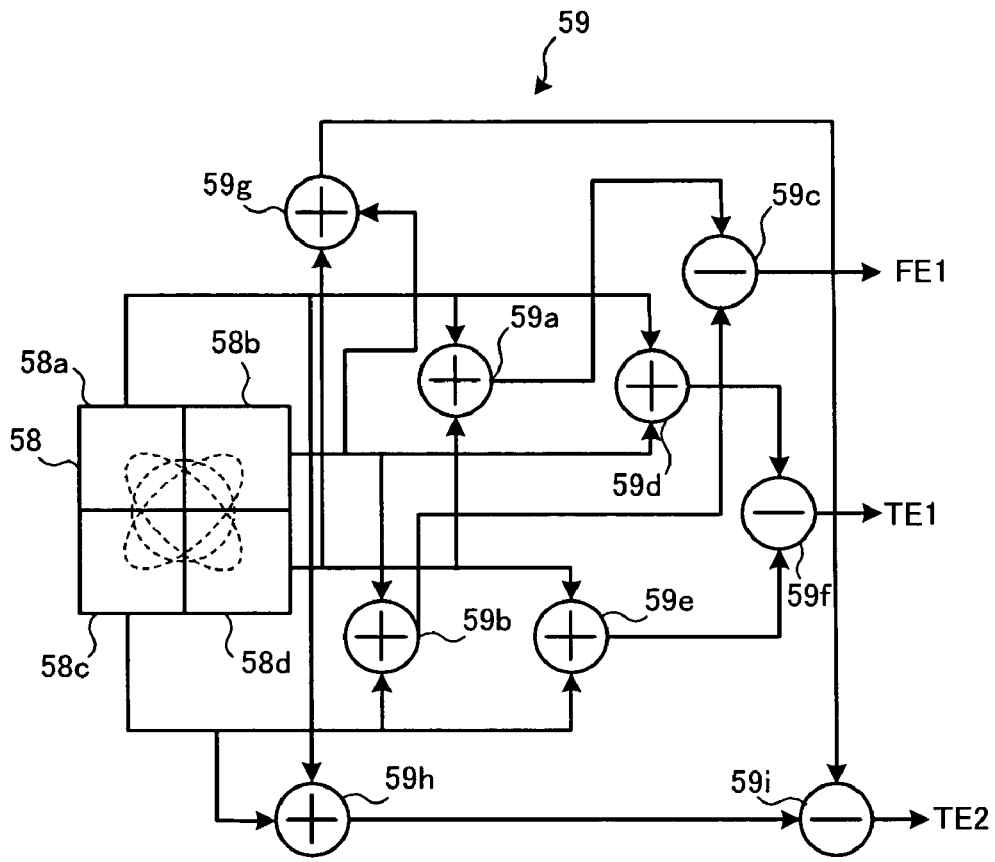
FIG. 10 is a block diagram of a first correction circuit.

The first correction circuit 59 is a control circuit for the first correction that receives the misalignment signal output from the quarter dividing photodetector 58 to calculate an amount of movement of the spatial light modulator 40 and the imaging lens 24 necessary for the first correction. Further, the first correction circuit 59 outputs a driving signal to the voice coil motor 60 and the piezoactuator 61 for the movement control corresponding to the calculated amount of movement. The first correction circuit 59 is shown in block form in FIG. 10. As shown in FIG. 10, the first correction circuit 59 includes an adder 59a that adds outputs from beam receivers 58a and 58d located at one opposing corners of the quarter dividing photodetector 58, an adder 59b that adds outputs from beam receivers 58b and 58c located at another opposing corners of the quarter dividing photodetector 58, a subtractor 59c that calculates a difference between the output from the adder 59a and the output from the adder 59b to generate a focus error signal FE1 by astigmatism method, an adder 59d that adds outputs from beam receivers 58a and 58b located next to each other in a lateral direction of the quarter dividing phototdetector 58, an adder 59e that adds outputs from beam receivers 58c and 58d that located next to each other in a lateral direction (a Y direction in FIG. 2) of the quarter dividing photodetector 58, a subtractor 59f that calculates a difference between the output from the adder 59d and the output from the adder 59e to generate a tracking error signal TE1 by push-pull method, an adder 59g that adds outputs from beam receivers 58b and 58d located next to each other in a longitudinal direction (a direction perpendicular to X direction and Y direction in FIG. 2) of the quarter dividing photodetector 58, an adder 59h that adds outputs from beam receivers 58a and 58c located next to each other in the longitudinal direction of the quarter dividing photodetector 58, and a subtractor 59i that calculates a difference between the output from the adder 59g and the output from the adder 59h to generate a tracking error signal TE2 by push-pull method.

Returning to FIG. 2, again, the voice coil motor 60 is a moving unit that moves the imaging lens 24 in three directions, i.e. two directions perpendicular to the optical axis direction of the imaging lens 24 (X direction and Y direction in FIG. 2) and the direction of the optical axis (a direction perpendicular to X and Y directions in FIG. 2) for the first correction. The piezoactuator 61 is a moving unit that moves the spatial light modulator 40 in three directions, i.e. two directions perpendicular with each other in a modulation plane of the spatial light modulator 40 (X and Y directions in FIG. 2) and a direction of the perpendicular line of the modulation plane (a direction perpendicular to X and Y directions in FIG. 2) for the first correction.

The first correcting beam source 51, the collimate lens 52, the polarizing beam splitter 53, the waveplate 54, the condenser lens 55, the convex lens 56, the cylindrical lens 57, and the quarter dividing photodetector 58 correspond to a first misalignment detecting unit in the appended claims. More specifically, the first correcting beam source 51 corresponds to a light source, and the quarter dividing photodetector corresponds to a beam receiving unit. The first correction circuit 59, the voice coil motor 60, and the piezoactuator 61 correspond to a first misalignment correcting unit in the appended claims. More specifically, the first correction circuit 59 corresponds to a calculating unit, and the voice coil motor 60 and the piezoactuator 61 correspond to a driving unit.

A structure of the second correction optical system 70 is explained. The second correction optical system 70 is a second correcting unit that corrects a relative position of the recording/reproducing optical system 20 and the optical recording medium 1, and includes a second correcting beam source 71, a collimate lens 72, a polarizing beam splitter 73, a waveplate 74 for optical rotation, a convex lens 75, a cylindrical lens 76, a quarter dividing photodetector 77, a second correction circuit 78, and a voice coil motor 79.

The second correcting beam source 71 serves as a light source of beams for the second correction (hereinafter referred to as a second correcting beam as necessary), and employs a linearly-polarized laser, for example. The second correcting beam is desirably in a different wavelength from the recording/reproducing beam emitted from the recording/reproducing beam source 21. For example, when the recording/reproducing beam source 21 employs a laser with wavelength of approximately 532 nm, the second correcting beam source 71 preferably employs a red laser diode of approximately 650 nm in wavelength. The collimate lens 72 is a collimated beam generating unit that converts the second correcting beam into a collimated beam. The polarizing beam splitter 73 serves to transmit the second correcting beam emitted from the second correcting beam source 71 and to reflect the second correcting beam reflected by the optical recording medium 1. The waveplate 74 serves to rotate the plane of polarization of the beams transmitted through the waveplate 74 and can be formed with a ¼ waveplate or a ½ waveplate, for example. The quarter dividing photodetector 77 is a photoelectric converter having beam receivers 77a to 77d (not shown in FIG. 2) as four separate parts, receives the second correcting beam reflected by the optical recording medium 1, and outputs an output signal (misalignment signal) corresponding to the misalignment between the optical recording medium 1 and the recording/reproducing optical system 20.

Figure 11:
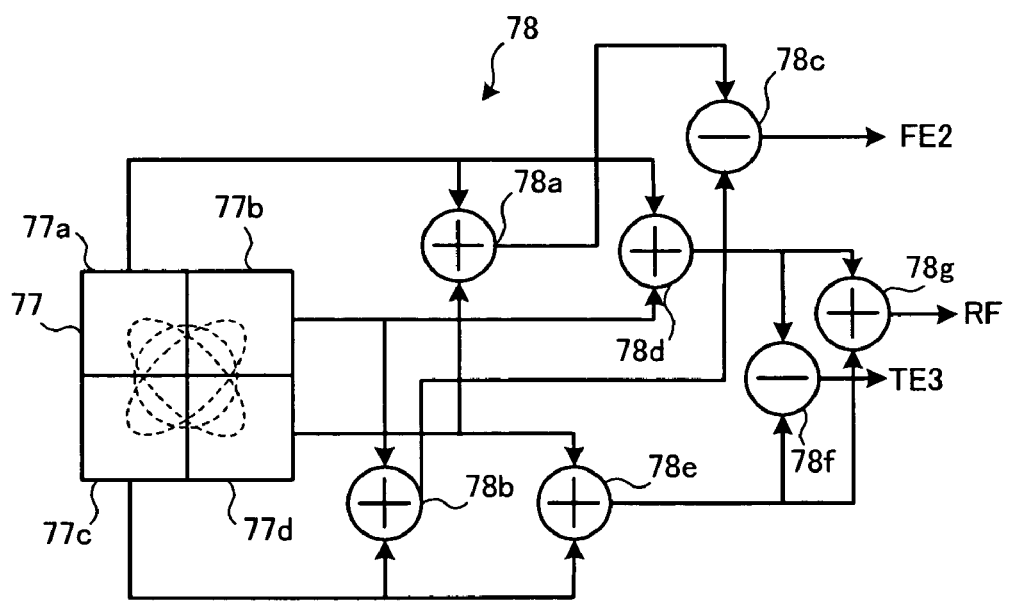
FIG. 11 is a block diagram of a second correction circuit.

The second correction circuit 78 is a control circuit for the second correction that receives the misalignment signal output from the quarter dividing photodetector 77, calculates an amount of movement of the objective lens 30 necessary for the second correction and supplies an output to the voice coil motor 79 for the movement control corresponding to the calculated amount of movement. The second correction circuit 78 is shown in a block form in FIG. 11. As shown in FIG. 11, the second correction circuit 78 includes an adder 78a that adds outputs from beam receivers 77a and 77d located at one opposing corners of the quarter dividing photodetector 77, an adder 78b that adds outputs from beam receivers 77b and 77c located at another opposing corners of the quarter dividing photodetector 77, a subtractor 78c that calculates a difference between the output from the adder 78a and the output from the adder 78b to generate a focus error signal FE2 by stigmatism method, an adder 78d that adds outputs from beam receivers 77a and 77b located next to each other along a track direction of the quarter dividing photodetector 77, an adder 78e that adds outputs from beam receivers 77c and 77d located next to each other along the track direction of the quarter dividing photodetector 77, a subtractor 78f that calculates a difference between the output from the adder 78d and the output from the adder 78e to generate a tracking error signal TE3 by a push-pull method, and an adder 78g that adds the output from the adder 78d and the output from the adder 78e to generate a reproduction signal RF. In the present embodiment, the reproduction signal RF is a signal that reproduces the information previously recorded on the reflective layer 7 of the optical recording medium 1.

Returning to FIG. 2, again, the voice coil motor 79 is a driving unit that can move the objective lens 30 in three directions, i.e., two directions perpendicular to the direction of the optical axis of the objective lens 30 (X and Y directions in FIG. 2) and the direction of the optical axis (a direction perpendicular to X and Y directions in FIG. 2) for the second correction.

The second correcting beam source 71, the collimate lens 72, the polarizing beam splitter 73, the waveplate 74 for optical rotation, the convex lens 75, the cylindrical lens 76, and the quarter dividing phototdetector 77 correspond to a second misalignment detecting unit in the appended claims. The second correction circuit 78 and the voice coil motor 79 correspond to a second misalignment correcting unit in the appended claims.

An information recording/reproduction method conducted with the hologram recording/reproducing apparatus 10 having the above-described structure is explained. The recording and reproduction of the information, however, can be conducted basically in the same manner as in the conventional technique and only an outline is explained herein. A method of information recording is explained first. The recording/reproducing beam emitted from the recording/reproducing beam source 21 in FIG. 2 is expanded and shaped into a collimated beam by the beam expander 22, to be irradiated onto the spatial light modulator 40 via the mirror 23. Then, the modulation pattern as shown in FIG. 3 is displayed on the spatial light modulator 40. Thus, among the recording/reproducing beams irradiated onto the spatial light modulator 40, the beams irradiated onto the information beam area 42 is spatially modulated to be the information beam including the information as a two-dimensional pattern, while the beams irradiated onto the reference beam area 43 is spatially modulated to be the reference beam. In other words, the recording beam is generated so as to include the information beam in the central portion of the optical axis and the reference beam in the peripheral portion of the optical axis. The recording beam is incident on the polarizing beam splitter 27 sequentially via the imaging lens 24, the mirror 25, and the imaging lens 26.

Here, the direction of polarization of the recording beam (the direction of polarization of the recording/reproducing beam) is adjusted at the time of emission from the recording/reproducing beam source 21 so that the recording beam passes through the polarizing beam splitter 27. Hence, the recording beam passes through the polarizing beam splitter 27 and enters the dichroic prism 28. The recording beam transmitted through the dichroic prism 28, further passes through the waveplate 29, is irradiated onto the optical recording medium 1 via the objective lens 30, and condensed so that the beam diameter is minimum on a surface of the reflective layer 7 of the optical recording medium 1 of FIG. 1. With the irradiation of the recording beam onto the optical recording medium 1, the information beam and the reference beam constituting the recording beam interfere with each other in the recording layer 3, to form the hologram 8 with the interference pattern in the optical recording medium 1. Thus, the information is recorded in the optical recording medium 1.

The information reproduction is conducted as follows. Returning to FIG. 2 again, the recording/reproducing beam emitted from the recording/reproducing beam source 21 is irradiated onto the spatial light modulator 40 as at the recording. At the reproduction, the modulation pattern as shown in FIG. 4 is displayed on the spatial light modulator 40. The modulation pattern at the reproduction only has the reference beam area 43 same with that in the modulation pattern at the recording shown in FIG. 3. Hence, only the beam irradiated onto the reference beam area 43 among the recording/reproducing beam irradiated onto the spatial light modulator 40 is spatially modulated, and only the reference beam same with that at the recording is generated. The reference beam is, similarly to the time of recording, irradiated onto the optical recording medium 1 and a part thereof is diffracted by the hologram 8 of FIG. 1, on passing through the optical recording medium 1 to be a reproducing beam.

The reproducing beam, after the reflection by the reflective layer 7, passes through the objective lens 30 shown in FIG. 2, and is rotated by the waveplate 29 on passing therethrough. Thus, the reproducing beam comes to include a different polarizing component from the reference beam. Hence, the reproducing beam, after passing through the dichroic prism 28, is reflected by the polarizing beam splitter 27. The reflected reproducing beam is focused onto the two-dimensional photodetector 32 via the imaging lens 31 as a reproduction image. A portion of the reference beam which is not diffracted by the hologram 8 of FIG. 1 is transmitted and focused onto the two-dimensional photodetector 32 of FIG. 2 similarly to the reproducing beam. In the two-dimensional photodetector 32, however, the reproducing beam is focused at the center portion while the transmitted beam is focused at the peripheral portion. Hence, the reproducing beam can easily be spatially separated for reproduction of the information recorded on the optical recording medium 1.

A misalignment correction with the first correction optical system 50 and the second correction optical system 70 is explained. Here, a relative position of the recording/reproducing optical system 20 and the spatial light modulator 40 is corrected with the first correction optical system 50, followed by a correction of a relative position of the recording/reproducing optical system 20 and the optical recording medium 1 with the second correction optical system 70. The corrections are conducted in this order since the corrected relative position in the first conducted correction either of the recording/reproducing optical system 20 and the spatial light modulator 40 or of the recording/reproducing optical system 20 and the optical recording medium 1 is employed as a reference for the following correction. However, the first correction or the second correction may precede the other. When it is not necessary to perform the corrections in sequence, it is possible to perform the corrections simultaneously.

First, the correction with the first correction optical system 50 is explained. The first correction beam emitted from the first correcting beam source 51 and having a different wavelength from the recording/reproducing beam is shaped into a collimated beam by the collimate lens 52 to be incident on the polarizing beam splitter 53. Here, to allow the transmission of the first correcting beam through the polarizing beam splitter 53, the direction of polarization of the first correcting beam is adjusted upon emission from the first correcting beam source 51. Hence, the first correcting beam passes through the polarizing beam splitter 53. Thus transmitted first correcting beam passes through the waveplate 54 and the condenser lens 55 to be incident on the dichroic prism 28. Here as mentioned above, the dichroic prism 28 is designed so as to transmit the beam with the wavelength of the recording beam and to reflect the beam with the wavelength of the first correcting beam. Hence, the first correcting beam is reflected by the dichroic prism 28 and enters the polarizing beam splitter 27. Since the polarizing beam splitter 27 is designed so as to transmit the beam with the wavelength of the first correcting beam as mentioned above, the first correcting beam passes through the polarizing beam splitter 27 and enters the spatial light modulator 40 sequentially via the imaging lens 26, the mirror 25, and the imaging lens 24. The emission of the first correcting beam from the first correcting beam source 51 up to the incidence of the first correcting beam into the spatial light modulator 40 corresponds to the irradiation step in the appended claims.

Here, the first correcting beam is condensed to the minimum beam diameter on the surface of the alignment mark M of the spatial light modulator 40 of FIGS. 5 and 6 by the imaging lens 24. The alignment mark M is designed so as to transmit the recording/reproducing beam and to reflect the first correcting beam. Thus, the first correcting beam is reflected by the alignment mark M and diffracted by tracks T1 and T2 at reflection.

The first correcting beam, after the diffraction and reflection by the spatial light modulator 40, enters the dichroic prism 28 sequentially via the imaging lens 24, the mirror 25, the imaging lens 26 and the polarizing beam splitter 27. Then, the first correcting beam is reflected by the dichroic prism 28 and further passes through the condenser lens 55 and the waveplate 54. Since the first correcting beam comes to include a different polarizing component from the beam as emitted from the first correcting beam source 51 on passing through the waveplate 54, the first correcting beam is reflected by the polarizing beam splitter 53. In view of the reflection efficiency, the rotation angle of the waveplate 54 is desirably adjusted so that the reflectance ratio of the first correcting beam at the polarizing beam splitter 53 is maximum. Thus reflected first correcting beam passes through the convex lens 56 and the cylindrical lens 57, to be received by the quarter dividing phototdetector 58 (corresponding to the reception of beam step in the appended claims). The cylindrical lens 57 changes the shape of the first correcting beam to adjust the misalignment of focus direction (optical axis direction).

Then, as shown in FIG. 10, a misalignment signal is output from the respective beam receivers 58a to 58d of the quarter dividing photodetector 58 corresponding to the misalignment of the recording/reproducing optical system 20 and the spatial light modulator 40 (corresponding to the detection step in the appended claims). The first correction circuit 59 drives the piezoactuator 61 in FIG. 2 and moves the spatial light modulator 40 toward the direction of perpendicular thereof so that the focus error signal FE1 obtained based on the misalignment signal attains zero. The first correction circuit 59 also drives the piezoactuator 61 of FIG. 2 and moves the spatial light modulator 40 in two directions perpendicular with each other in the modulation plane so that the tracking error signals TE1 and TE2 obtained from the quarter dividing photodetector 58 in FIG. 10 both attain zero. Further, when a rapid misalignment component is generated due to the vibration or the like at the recording/reproduction, the first correction circuit 59 drives the voice coil motor 60 of FIG. 2 and drives the imaging lens 24 in two directions perpendicular to the optical axis direction of the imaging lens 24 and the optical axis direction so that the focus error signal FE1 and the tracking error signals TE1 and TE2 all attain zero, thereby correcting the misalignment (the movement of the spatial light modulator 40 and the imaging lens 24 corresponds to the correction step in the appended claims).

Thus, the correction of relatively large amount is conducted by the piezoactuator 61 that moves the spatial light modulator 40 whereas the correction of relatively small amount is conducted by the voice coil motor 60 that moves the imaging lens 24. The movement of the spatial light modulator 40 is more direct and preferable for the first correction. However, the spatial light modulator 40 is heavier and more difficult to move rapidly compared with the optical element such as the imaging lens 24. Hence, in the embodiment, rough correction is first performed with the movement of the spatial light modulator 40 followed by minute and rapid correction conducted with the movement of the imaging lens 24. When correction is performed with the movement of a plurality of elements (spatial light modulator 40 and imaging lens 24), the speed of response of the correction can be enhanced.

In the first correction, the misalignment of the spatial light modulator 40 can be corrected with the movement of an optical element other than the imaging lens 24, such as the imaging lens 26. The imaging lens 26 is, however, arranged farther from the spatial light modulator 40 compared with the imaging lens 24. Hence, for the correction of the same amount of misalignment, the imaging lens 26 needs to be moved farther than the imaging lens 24, which is not preferable in view of the speed of response. In other words, it is preferable in view of the speed of response to correct the misalignment of the spatial light modulator 40 with the movement of an optical element in closest proximity to the spatial light modulator 40, i.e., the imaging lens 24.

The correction of the relative position of the recording/reproducing optical system 20 and the optical recording medium 1 with the second correction optical system 70 is explained. The second correcting beam emitted from the second correcting beam source 71 in FIG. 2 is shaped into a collimated beam by the collimate lens 72 and enters the polarizing beam splitter 73. The direction of polarization of the second correcting beam is adjusted upon emission from the second correcting beam source 71 so that the second correcting beam passes through the polarizing beam splitter 73. Thus, the second correcting beam passes through the polarizing beam splitter 73. Then, the second correcting beam passes through the waveplate 74 and is reflected by the dichroic prism 28. Further, the second correcting beam passes through the waveplate 29, is irradiated onto the optical recording medium 1 via the objective lens 30, passes through the dichroic reflective layer 5 of the optical recording medium 1 of FIG. 1, and is condensed to the minimum beam diameter on the surface of the reflective layer 7. The second correcting beam is reflected by the reflective layer 7 and modulated at the reflection by pits (not shown) that are formed on the surface of the reflective layer 7.

The second correcting beam modulated and reflected by the optical recording medium 1 is collimated by the objective lens 30, passes through the waveplate 29, is reflected by the dichroic prism 28 and further passes through the waveplate 74. The second correcting beam comes to include a different polarization component from the beam as emitted from the second correcting beam source 71, on passing through the waveplates 29 and 74. Hence, the second correcting beam is reflected by the polarizing beam splitter 73, passes through the convex lens 75 and the cylindrical lens 76, and is detected by the quarter dividing photodetector 77. Then, as in FIG. 11, the second correction circuit 78 drives the voice coil motor 79 of FIG. 2 and moves the objective lens 30 so that the focus error signal FE2 and the tracking error signal TE3 obtained from the quarter dividing photodetector 77 each attain zero, thereby correcting the misalignment.

As explained above, in the present embodiment as in the conventional technique, the relative position of the optical recording medium 1 and the recording/reproducing optical system 20 can be corrected with the second correction optical system 70, whereas the relative position of the recording/reproducing optical system 20 and the spatial light modulator 40 can be corrected with the first correction optical system 50. As a result, the relative position of the optical recording medium 1 and the spatial light modulator 40 can be corrected based on the recording/reproducing optical system 20. Hence, at the information recording, the fluctuation in the hologram 8 caused according to the fluctuation in the arrangement of respective optical elements can be suppressed, while at the information reproduction, the fluctuation in the intensity of reproducting beam caused according to the fluctuation in arrangement of respective optical elements can be suppressed. Thus, the reproducibility of the relative position between the optical recording medium 1 and the spatial light modulator 40 at the information recording and reproduction can be enhanced. Thus, more precise reproduction of information is allowed. Further, even when the optical recording medium 1 is inserted/removed to/from the hologram recording/reproducing apparatus 10, the proper alignment is possible. Thus, the portability of the optical recording medium 1, the compatibility of various hologram recording/reproducing apparatus 10 can be enhanced.

A second embodiment of the present invention is explained. In the second embodiment, a hologram recording/reproducing apparatus of transmissive colinear interfererometry is employed. A component not specifically explained is same with the component in the optical recording medium explained with reference to the first embodiment. The same component is denoted with same reference character.

Figure 12:
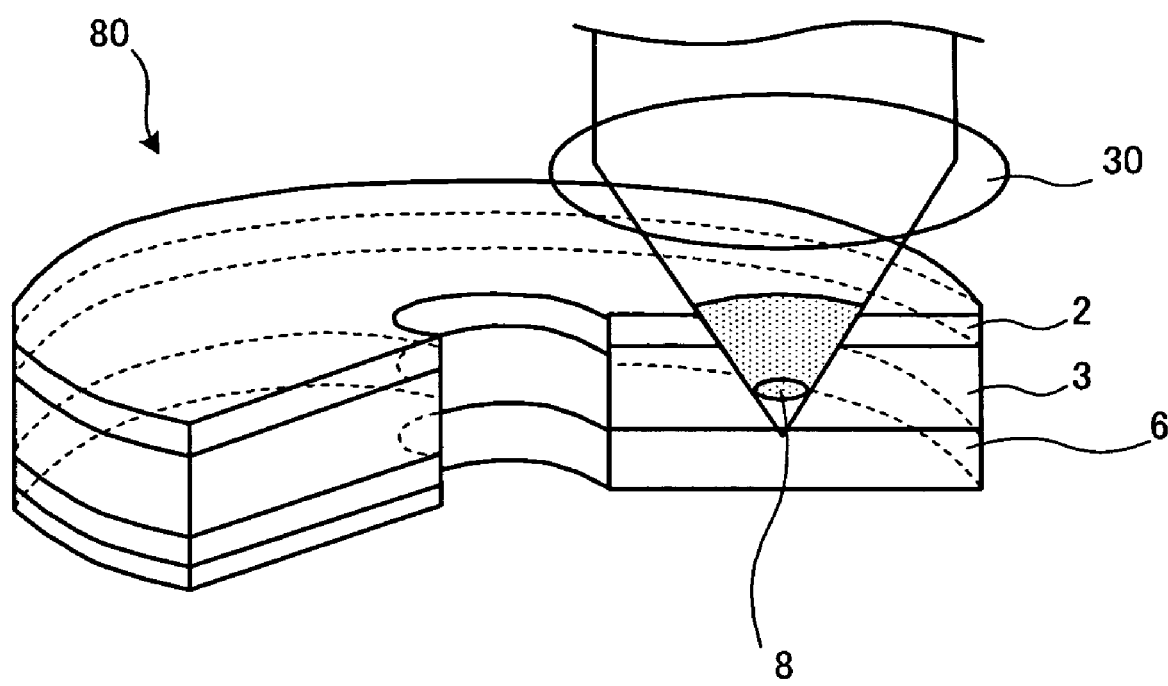
FIG. 12 is a perspective view of an optical recording medium employed in a second embodiment.

First, a structure of an optical recording medium 80 to be employed for the recording/reproduction by the hologram recording/reproducing apparatus according to the embodiment is explained. FIG. 12 is a perspective view of the optical recording medium 80 (a side part of the optical recording medium is shown to be broken). The optical recording medium 80, different from the first embodiment, needs to transmit the reproducing beam without reflecting the same. Hence, the optical recording medium 80 is of a structure of the optical recording medium 1 without the gap layer 4, the dichroic reflective layer 5, and the reflective layer 7. On the outer side surface of the transparent substrate 6, pits (not shown) are formed for tracking servo.

Figure 13:
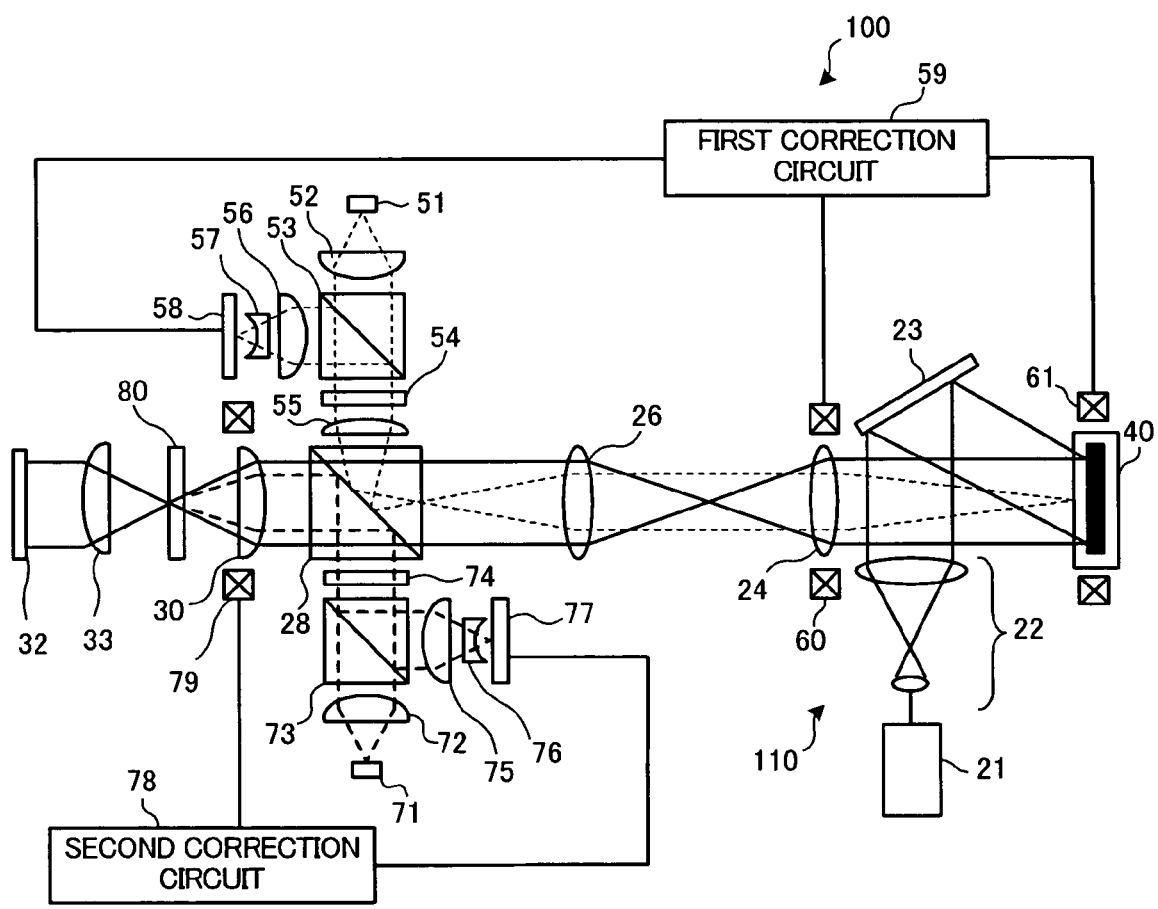
FIG. 13 is a diagram of an overall structure of a hologram recording/reproducing apparatus according to the second embodiment.

A structure of a hologram recording/reproducing apparatus 100 for recording/reproducing information on the optical recording medium 80 with the above-described structure is explained. FIG. 13 is a diagram of an overall structure of the hologram recording/reproducing apparatus 100 according to the second embodiment. A component not specifically mentioned is same as in the hologram recording/reproducing apparatus 100 of the first embodiment and the same component is denoted with the same reference character. The hologram recording/reproducing apparatus 100 includes a recording/reproducing optical system 110, a spatial light modulator 40, a first correction optical system 50, and a second correction optical system 70.

The recording/reproducing optical system 110 transmits the reproducing beam without reflecting the same by the optical recording medium 80 and focuses the reproducing beam on the two-dimensional photodetector 32. Hence, different from the first embodiment, the imaging lens 33 and the two-dimensional photodetector 32 are arranged as opposing to the spatial light modulator 40 with the optical recording medium arranged therebetween. Further, the polarizing beam splitter 27 shown in FIG. 2 is not included. Still further, different from the first embodiment, in the second embodiment, the spatial light modulator 40 and the imaging lens 24 are arranged so that the optical axis of the imaging lens 24 matches with the optical axis of the imaging lens 26. However, the structure using the mirror 25 as in the first embodiment may be employed. The spatial light modulator 40, the first correction optical system 50, and the second correction optical system 70 have same structures as in the first embodiment.

Next, the information recording/reproducing method with the hologram recording/reproducing apparatus 100 having the above-described structure is explained. The information recording is first explained. The recording/reproducing beam emitted from the recording/reproducing beam source 21 in FIG. 13, similarly to the first embodiment, is irradiated onto the optical recording medium 80 via the spatial light modulator 40, the dichroic prism 28 and the like, whereby the hologram 8 of FIG. 12 is formed on the optical recording medium 80. Thus, the information is recorded on the optical recording medium 80.

Next, the information reproduction is explained. Returning to FIG. 13, the recording/reproducing beam emitted from the recording/reproducing beam source 21, similarly to the first embodiment, is modulated by the spatial light modulator 40 to be the reference beam. The resulting reference beam is irradiated onto the optical recording medium 80 via the dichroic prism 28 or the like. A part of the reference beam is diffracted by the hologram 8 to be a reproducing beam on passing through the optical recording medium 80. The reproducing beam is emitted via the optical recording medium 80 and focused on the two-dimensional photodetector 32 by the imaging lens 33 as a reproduction image. The reference beam not diffracted by the hologram 8 is transmitted and focused on the two-dimensional photodetector 32 similarly to the reproducing beam. Since the focused reference beam has the reproducing beam in the center portion and the transmissive beam in the peripheral portion, the reproducing beam can easily be spatially separated for the reproduction of information recorded on the optical recording medium 80.

The correction of misalignment with the first correction optical system 50 and the second correction optical system 70 is explained. The correction with the first correction optical system 50 is conducted similarly to the first embodiment. The first correcting beam emitted from the first correcting beam source 51 in FIG. 13 passes through the polarizing beam splitter 53, is reflected by the dichroic prism 28, and enters the spatial light modulator 40 as in the first embodiment. The first correcting beam is reflected by the alignment mark M of the spatial light modulator 40 of FIGS. 5 and 6 and diffracted by the tracks T1 and T2 at reflection. The first correcting beam thus diffracted and reflected by the spatial light modulator 40 is reflected by the dichroic prism 28 and comes to include a different polarization component from the beam as emitted from the first correcting beam source 51 on passing through the waveplate 54. Thus, the first correcting beam is reflected by the polarizing beam splitter 53 to be received by quarter dividing photodetector 58. The following process of the first correction is same with the first embodiment.

The second correction is conducted in the same manner as in the first embodiment except that the second correcting beam passes through the optical recording medium 80. The second correcting beam emitted from the second correcting beam source 71 in FIG. 13, as in the first embodiment, is irradiated onto the optical recording medium 80 via the dichroic prism 28 or the like and condensed to the minimum beam diameter on the outer surface of the transparent substrate 6 of the optical recording medium 80. A part of the second correcting beam is reflected at the outer surface of the transparent substrate 6 and modulated by the pits formed on the outer surface of the transparent substrate 6. The second correcting beam after the modulation and reflection by the optical recording medium 80 enters the quarter dividing photodetector 77 via the dichroic prism 28 or the like, similarly to the first embodiment. The following process of the second correction is same with the first embodiment.

Thus, also in the transmissive colinear interferometry hologram recording/reproducing apparatus 100 according to the second embodiment, the relative position of the optical recording medium 80 and the recording/reproducing optical system 110 can be corrected with the second correction optical system 70. Further, the relative position of the recording/reproducing optical system 110 and the spatial light modulator 40 can be corrected with the first correction optical system 50. As a result, the relative position of the optical recording medium 80 and the spatial light modulator 40 can be corrected based on the recording/reproducing optical system 110. Hence, at the information recording, the fluctuation of the hologram 8 caused according to the fluctuation of the arrangement of respective optical elements can be suppressed whereas at the information reproduction, the fluctuation in the intensity of reproducing beam caused according to the fluctuation in the arrangement of respective optical element can be suppressed.

A result of an evaluation test of recording/reproduction performance of the hologram recording/reproducing apparatus 10 according to the first embodiment is explained. In a first example, the information is recorded onto the optical recording medium 1 with the hologram recording/reproducing apparatus 10. Then, the reproduction is carried out by the same hologram recording/reproducing apparatus 10 with correction and without correction. The results from the reproduction with correction are compared with the results from the reproduction without correction.

Details of the hologram recording/reproducing apparatus 10 used in the first example is explained. A neodymium YAG laser emitting a coherent beam of a second harmonic (wavelength of 532 nm) is used as the recording/reproducing beam source 21 of FIG. 2, and a linearly-polarized laser diode (wavelength of 650 nm) is used as the first correcting beam source 51 and the second correcting beam source 71 of FIG. 2. A track of 1 μm in width is provided in the form of a cross as the alignment mark M of the spatial light modulator 40 of FIGS. 5 and 6. Further, a CCD array is used as the two-dimensional photodetector 32 of FIG. 2, a ¼ wavelength plate for 532 nm wavelength is used as the waveplate 29 and a ¼ waveplate for 650 nm wavelength are used as the waveplates 54 and 74. Further, the orientation of the wavelength plate used as the waveplate 29 is adjusted so that the intensity of the reproducing beam is maximum at the upper surface of the two-dimensional photodetector 32. Further, the orientations of the waveplates 54 and 74 are adjusted so that the light intensity at the quarter dividing photodetectors 58 and 77 are maximum, respectively.

The optical recording medium 1 is mounted onto the hologram recording/reproducing apparatus 10 with the above-described structure and the information recording is conducted. Specifically, the optical recording medium 1 is secured on the spindle motor (not shown) and made to rotate at the speed of 1 rpm. While the first correction and the second correction are conducted, the recording/reproducing beam source 21 is made to flash in synchronization with address signals and the recording of the hologram 8 is performed. Here, the light intensity on the surface of the optical recording medium 1 is 0.1 mW, and the spot size of the laser beam on the upper surface of the recording layer 3 is 500 μm in diameter. An area of ninety thousands pixels (300×300) is used as the pixels 41 of the DMD 46 in the spatial light modulator 40. An area of 22500 pixels (150×150) in the center is used as the information beam area 42. Neighboring nine pixels (3×3) are defined as one unit panel and total of 2500 panels are used as the information beam area. For the input of information, 9:5 modulation is used where five panels of the nine panels (3×3) are used as bright panels, i.e. panels transmitting the light.

Thus recorded information is reproduced under two different conditions. First, the optical recording medium 1 is removed from the hologram recording/reproducing apparatus 10. Then the optical recording medium 1 is secured on a spindle motor (not shown) of the same hologram recording/reproducing apparatus 10 again. Then, the optical recording medium 1 is made to rotate at the speed of 1 rpm. While the first correction and the second correction are conducted, the recording/reproducing beam source 21 is made to flash in synchronization with address signals and the reproduction of the hologram 8 is performed with the two-dimensional photodetector 32. At the reproduction, only the reference beam area 43 as shown in FIG. 4 is displayed on the DMD 46 of the spatial light modulator 40 to generate the reference beam. The light intensity on the surface of the optical recording medium 1 is 0.05 mW.

Then, the information is reproduced under the same condition as the first reproduction, but without the first correction and the second correction. The results of reproductions under two different conditions are compared. Specifically, a particular threshold is set with respect to each pixel 41 in the information beam area 42 (150×150) obtained by the two-dimensional photodetector 32. Based on the threshold, the determination of bright panel and dark panel at the reproduction under each condition is performed to provide an output pattern. The output pattern is compared with an input pattern that is provided to the DMD 46 of the spatial light modulator 40. As a result, while in the reproduction with the first and the second corrections, no panel is determined to be erroneous among 2500 panels, in the reproduction without the first and the second corrections, ten panels are determined to be erroneous among 2500 panels. Thus, it is confirmed that the first and the second correction reduce the number of panels determined to be erroneous, thus enhancing the precision of information reproduction.

In the second example, information is recorded in the optical recording medium 1 with the hologram recording/reproducing apparatus 10. After the recording, the reproduction is performed with a different hologram recording/reproducing apparatus 10 from the apparatus used for the recording, first with correction and then without correction. The conditions and results not specifically mentioned are same with the first example. The hologram recording/reproducing apparatus used for the recording (hereinafter referred to as a hologram recording/reproducing apparatus 10A) and a hologram recording/reproducing apparatus used for the reproduction (hereinafter referred to as a hologram recording/reproducing apparatus 10B) are different apparatuses with the same structure. The positioning error between the tracks T1 and T2 provided as the alignment mark M in the spatial light modulator 40 of the hologram recording/reproducing apparatus 10A and the tracks T1 and T2 provided as the alignment mark M in the spatial light modulator 40 of the hologram recording/reproducing apparatus 10B is equal to or less than 1 μm.

First, the optical recording medium 1 where the information is recorded with the hologram recording/reproducing apparatus 10A is removed from the hologram recording/reproducing apparatus 10A and is placed in another hologram recording/reproducing apparatus 10B and secured onto a spindle motor (not shown). Then the information is reproduced while the first and the second corrections are performed.

Then, with the hologram recording/reproducing apparatus 10B, the information is reproduced under the same condition but without the first and the second corrections. Then the results of reproduction under two different conditions are compared. As a result, while in the reproduction with the first and the second corrections, the number of panels determined to be erroneous is zero among 2500 panels, in the reproduction without the first and the second corrections, the number of panels determined to be erroneous is 50 among 2500 panels. Hence, it is confirmed that even when the different hologram recording/reproducing apparatus 10B is used for the reproduction, the number of the panels determined to be erroneous can be reduced with the first and the second corrections, whereby the precision of information reproduction can be enhanced.

In a third example, information recorded without the first correction is reproduced in the same hologram recording/reproducing apparatus 10 with the apparatus at the time of recording, first with correction and then without correction. The results are compared and explained. The conditions and results not specifically mentioned are same with the first example.

First, the optical recording medium 1 is mounted onto the hologram recording/reproducing apparatus 10 for the information recording. At the recording the first correction is not performed and only the second correction is performed.

Then, the optical recording medium 1 is removed from the hologram recording/reproducing apparatus 10 and placed and secured again in the same hologram recording/reproducing apparatus 10. The reproduction is performed with the first and the second corrections.

Then, the reproduction of information is performed again, under the same condition, though without the first correction and only with the second correction. The results of reproduction under two different conditions are compared. As a result, in the reproduction with the first and the second corrections the number of panels determined to be erroneous is eighty among 2500 panels, whereas in the reproduction only with the second correction the number of panels determined to be erroneous is 150 panels among 2500 panels. Thus, it is confirmed that the number of panels determined to be erroneous can be further reduced when both first and second corrections are performed compared with the reproduction only with the second correction, whereby the precision in information reproduction can be enhanced. In comparison with the results of the first example, it is confirmed that the precision in information reproduction can be enhanced when the first correction is performed also at the time of recording.

In the foregoing, the exemplary embodiments and examples are explained. Specific structure and method of the present embodiments can optionally changed or improved in the scope of technical spirit of the invention as defined by the appended claims. Modifications of the embodiments are explained below.

The optical recording medium 1 or 80 can be structured in a different known form than in the above-described form. For example, the focus positions of the recording beam and the second correcting beam can be made different, with the use of an objective lens having aberration chromatica, with a wider distance between the second correcting beam source 71 and the collimate lens 72 in FIG. 2, with the insertion of a concave lens for correction between the waveplate 74 and the dichroic prism 28 of FIG. 2, or the like.

In addition, any structure can be adopted as the basic structure of the hologram recording/reproducing apparatus to which the present invention is applied. For example, other than the reflective colinear interferometry or the transmissive colinear interferometry described above, the hologram recording/reproducing apparatus may use reflective two beam interferometry or transmissive two beam interferometry.

In addition, the spatial light modulator 40 shown in FIGS. 5 and 6 can be formed with another known structure other than the structure with the DMD 46 as described above. For example, the spatial light modulator 40 may be a reflective liquid crystal spatial light modulator, the transmissive liquid crystal spatial light modulator, or the like as far as it is provided with the plurality of pixels 41 and the transparent window 45. The shape of the alignment mark M can also be changed to forms other than the cross-shape described above. For example, more tracks can be provided to form a shape of beams radiating from the center. In addition, with respect to the position of formation of the alignment mark M in the direction of the optical axis of the spatial light modulator 40, the mark M is preferably formed in proximity to the pixel 41 for the strict focusing in the optical axis direction. In addition, a protective layer 2 may be further formed upon the transparent window 45 to suppress the scattering of light by the alignment mark M. Further, a dichroic reflective layer that transmits the recording beam but reflects the first correcting beam may be formed upon the surface where the alignment mark M is formed, to achieve an efficient reflection of the first correcting beam.

Further, the structure of the first correction optical system 50 can be optionally changed as far as the above-described effects can be realized. In particular, a specific structure of the optical elements can be varied. The driving unit may be formed so that only the spatial light modulator 40 is movable, only the imaging lens 24 is movable, the imaging lens 26 instead of the imaging lens 24 is movable, the imaging lens 26 in addition to the spatial light modulator 40 and the imaging lens 24 is movable, for example. Since the focusing in the optical axis direction of the spatial light modulator 40 has relatively large allowable value, the spatial light modulator 40 or the like may be formed to be movable only in X direction or Y direction in FIG. 2 and the movement in the optical axis direction may be omitted.

In the embodiments, the position of the optical recording medium 1 or 80 and the spatial light modulator 40 is corrected with both the first correction optical system 50 and the second correction optical system 70. When only the correction of relative position of the recording/reproducing optical system 20, 110 and the spatial light modulator 40 is desirable, however, the second correction optical system may be omitted. In addition, when both the first correction optical system 50 and the second correction optical system 70 are provided, the structure of the recording/reproducing optical system 20 can be simplified as shown in the embodiments if the first correcting beam and the second correcting beam are led to the recording/reproducing optical system 20 via the dichroic prism 28 which is a common optical element for both systems. In other words, compared with a conventional apparatus where only the second correction optical system 70 is provided, the apparatus of the embodiment allows the introduction of the first correcting beam into the recording/reproducing optical system 20 without the increase in the number of optical elements. However, if such benefit is not specifically necessary, the first correcting beam may be led to the recording/reproducing optical system 20 via any optical element. For example, in FIG. 2 another dichroic prism may be provided between the polarizing beam splitter 27 and the dichroic prism 28 so that the first correcting beam is led through the new dichroic prism to the recording/reproducing optical system 20.

In addition, the problems to be solved by the invention and the effects of the invention are not limited to those mentioned above. The problems not specifically described may be solved and the effects not specifically described may be exerted. A part of the problems described above may be solved or a part of the effects described above may be exerted. For example, even when the reproducibility at the irradiation of the optical recording medium with the reference beam is not hundred percent, as far as the reproducibility is enhanced compared with the conventional technique, it should be said that the problems are solved.

The drawings are merely exemplary and the dimension and the ratio of the components are not limited to those described in the drawings.

Further, all or a part of the control which is explained to be automatically performed in the embodiments may be manually performed. On the other hand, all or a part of the control which is explained to be manually performed may be automated according to the known technique or the idea of the present invention. In addition, the control process of the first correction circuit 59 and the second correction circuit 78 described with reference to the embodiments may be constituted as a Central Processing Unit (CPU) and a computer program which is read out and executed by the CPU.

Thus, the present invention is useful for the recording and reproduction utilizing the holography and particularly suitable for the enhancement of the reproducibility at the irradiation of the optical recording medium with the reference beam in the hologram recording/reproducing apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hologram recording/reproducing apparatus, comprising:
   a recording/reproducing optical system that guides at least one of an information beam and a reference beam to an optical recording medium;
   a spatial light modulator that is arranged in an optical path of the recording/reproducing optical system, and spatially modulates a beam guided via the recording/reproducing optical system to generate the information beam;
   a first misalignment detecting unit that detects a first misalignment between the recording/reproducing optical system and the spatial light modulator using a beam for detecting the first misalignment; and
   a first misalignment correcting unit that corrects the first misalignment based on the first misalignment detected by the first misalignment detecting unit,
   wherein the spatial light modulator includes a diffracting unit that diffracts the beam for detecting the first misalignment, and the diffracting unit includes an alignment mark that defines two directions that are approximately perpendicular to an optical axis of a recording/reproducing beam.

2. The hologram recording/reproducing apparatus according to claim 1, wherein:
the first misalignment detecting unit includes:
a first correcting beam source that irradiates the spatial light modulator with the beam for detecting the first misalignment; and
a beam receiving unit that receives the beam for detecting the first misalignment which is diffracted by the spatial light modulator, to output a misalignment signal corresponding to the first misalignment.

3. The hologram recording/reproducing apparatus according to claim 1, wherein:
the first misalignment correcting unit includes:
a calculating unit that calculates an amount of movement of the spatial light modulator; and
a driving unit that moves the spatial light modulator based on the amount of movement.

4. The hologram recording/reproducing apparatus according to claim 1, wherein:
the first misalignment correcting unit includes:
a calculating unit that calculates an amount of an optical element arranged in an optical path between the spatial light modulator and the optical recording medium in the recording/reproducing optical system based on the first misalignment; and
a driving unit that moves the optical element based on the amount of movement.

5. The hologram recording/reproducing apparatus according to claim 4, wherein:
the driving unit moves at least an optical element that is arranged in a closest proximity to the spatial light modulator among the optical elements arranged in the recording/reproducing optical system.

6. The hologram recording/reproducing apparatus according to claim 1, further comprising:
a second misalignment detecting unit that detects a second misalignment between the optical recording medium and the recording/reproducing optical system using a beam for detecting the second misalignment; and
a second misalignment correcting unit that corrects the second misalignment based on the second misalignment detected by the second misalignment detecting unit,
wherein the beam for detecting the first misalignment and the beam for detecting the second misalignment are guided to the recording/reproducing optical system via a common optical element in the recording/reproducing optical system.

7. A spatial light modulator arranged in an optical path of a recording/reproducing optical system that guides at least one of an information beam and a reference beam to an optical recording medium, and spatially modulates a beam guided via the recording/reproducing optical system to generate the information beam, comprising:
a diffracting unit that diffracts a beam for detecting a first misalignment between the spatial light modulator and the recording/reproducing optical system,
wherein the diffracting unit includes an alignment mark that defines two directions that are approximately perpendicular to an optical axis of a recording/reproducing beam.

8. A hologram recording/reproducing method of correcting a first misalignment between a recording/reproducing optical system and a spatial light modulator in a hologram recording/reproducing apparatus that includes the recording/reproducing optical system guiding at least one of an information beam and a reference beam to an optical recording medium, and the spatial light modulator arranged in an optical path of the recording/reproducing optical system and spatially modulates a beam guided via the recording/reproducing optical system to generate the information beam, comprising:
irradiating the spatial light modulator with a beam for detecting a first misalignment via the recording/reproducing optical system;
receiving the beam for detecting the first misalignment, the beam being diffracted by the spatial light modulator;
detecting the first misalignment based on a state of the received beam for detecting the first misalignment; and
correcting the first misalignment based on the detected first misalignment,
wherein the spatial light modulator includes a diffracting unit that diffracts the beam for detecting the first misalignment, and the diffracting unit includes an alignment mark that defines two directions that are approximately perpendicular to an optical axis of a recording/reproducing beam.

* * * * *